United States Patent [19]
Strauch et al.

[11] Patent Number: 4,767,464

[45] Date of Patent: Aug. 30, 1988

[54] CARBONATE-CONTAINING MINERAL FILLERS, PIGMENTS AND SIMILAR MATERIALS

[75] Inventors: Dieter Strauch, Zofingen; Peter Belger, Mühlethal; Heiner Hofer, Langenthal; Martin Merz, Zunzgen, all of Switzerland

[73] Assignee: Plüss-Staufer AG, Switzerland

[21] Appl. No.: 46,540

[22] Filed: May 6, 1987

[30] Foreign Application Priority Data

May 22, 1986 [DE] Fed. Rep. of Germany ....... 3617169

[51] Int. Cl.⁴ .............................................. C04B 14/00
[52] U.S. Cl. .................................... 106/464; 106/504; 423/165; 423/637
[58] Field of Search .................... 106/288 B, 306, 309; 423/165, 637

[56] References Cited

U.S. PATENT DOCUMENTS

| | | | |
|---|---|---|---|
| 3,022,185 | 2/1962 | Delfosse | 106/300 |
| 3,252,852 | 5/1966 | Lagally | 106/308 N |
| 3,661,610 | 5/1972 | Ferris | 106/288 B |
| 3,704,158 | 11/1972 | Rohan | 106/288 B |
| 3,920,800 | 11/1975 | Harris | 423/165 |
| 3,940,550 | 2/1976 | Delfosse et al. | 106/288 B |
| 4,018,877 | 4/1977 | Woode | 423/165 |
| 4,174,998 | 11/1979 | Shiel | 106/308 N |

FOREIGN PATENT DOCUMENTS

2346269-A 3/1975 Fed. Rep. of Germany.
2456463-A 8/1976 Fed. Rep. of Germany.
2737742-A 4/1978 Fed. Rep. of Germany.

*Primary Examiner*—Paul Lieberman
*Assistant Examiner*—Thompson, Willie J.

[57] ABSTRACT

Carbonate-containing mineral fillers, pigments and similar materials are disclosed which are characterized by a combination of four features. These carbonate-containing materials can be used in particular in dyes, paints, paper pulps, paper coatings and plastics to great advantage. In addition, a method of preparing these carbonate-containing materials is disclosed.

38 Claims, 5 Drawing Sheets

CARBONATE-CONTAINING MINERAL FILLERS, PIGMENTS AND SIMILAR MATERIALS

FIELD AND BACKGROUND OF THE INVENTION

The present invention relates to carbonate-containing mineral fillers, pigments and similar materials.

Fillers are generally understood to be relatively inexpensive substances which are mixed for example with materials, adhesive and coating materials, paper, plastics and the like in order to increase the volume and/or the weight of them, but often also to improve the industrial usability of them. It is also possible, by means of suitable additives to improve the quality e.g. the hardness, strength, elasticity and expansion of rubber and synthetic elastomers (the additives here being known as accelerators).

Pigments are inorganic or organic, multi-colored or monochromatic coloring agents which are practically insoluble in the medium in which they are used. Many inorganic pigments also act as fillers, and vice versa. Pigments are used in particular for coloring lacquers and paints, the coloring of plastics, paper, textiles, cement, concrete, ceramics, glass and enamel, cosmetics and foodstuffs, as well as for color printing in the graphics industry and as artists colors.

In the paper, paint and lacquer industries in particular products are required which have a high gloss and a high opacity. German Pat. No. 27 33 722 relates to a method for the continuous production of calcium sulphoaluminate pigment with a particle size of from 0.1 to 2.0 $\mu$m for paper coating by reaction of calcium hydroxide with aluminium sulphate. This method gives, among other things, a high gloss in printing papers, even under moderate calandering conditions on account of the high degree of hydration of gloss white, paper with a high opacity being obtained by the formation of a thick coating layer. German Pat. No. 1,938,162 relates to a method for coating paper or the like, in which a coating material consisting of a polymer composition contained in a liquid medium is applied to a web. This method is claimed to make possible the direct production of a light coating of high smoothness and opacity without the necessity of subsequent glazing.

German Auslegeschrift No. 20 26 963 relates to a method for producing a paper based on natural and/or synthetic fibres or a foil made of a synthetic material, and in particular a reproduction paper. In this method a methylene urea precipitate slightly polymerized in a strongly acid medium is incorporated into the fibre pulp as a white pigment or applied as a coating to the surface. In this way it is claimed that an improvement in the whiteness and an improvement in the opacity of the paper is achieved.

A further important property associated with papers is the retention value. The retention value indicates the amount of filler mixed, for example, in the pulp remains in the finished product. This will be explained in greater detail by the example of paper-making.

Fillers are understood to be materials which are used added to the paper.

It has long been known in the paper-making industry that costly fibres which are also relatively difficult to obtain can be replaced by fillers of mineral origin. The filler content of the various types of paper is between 10 and 30%. A further advantage of the use of fillers in paper production lies, among other things, in the fact that the finely distributed filler substances fill the interstices between the individual fibres and through this make the surface of the paper smoother and glossier and reduce the transparency of the paper, which is a fundamental requirement in the case of printing and writing paper types. A disadvantageous phenomenon, however, lies in the fact that by increasing the quantity of filler the size content of the paper is reduced or more resin is required to obtain the same size content, and also that the tearing length of the paper is reduced.

Fillers are usually classified, on the basis of their chemical composition, into silicates, sulphates, carbonates and oxides. Kaolin, which belongs to the silicate group, is the most widely used in the paper industry. The main reason for the wide use of kaolin is the relatively inexpensive price of it and in its retention of about 60–70%. The retention value indicates the quantity of filler mixed in the pulp that remains in the finished product.

There are limitations to the use of chalk, which belongs to the carbonate group, despite its technologically favourable properties, imposed by its retention of about 50–55% as compared with kaolin. The chalk used as a filler is produced from the residues of supporting structures of microorganisms, which occur frequently in nature and are for the most part of microscopic fineness, the so-called nanofossils, by suspension. By precipitation from calcium chloride solution by means of sodium carbonate or from calcium hydroxide solution by means of carbon dioxide, so-called precipitated calcium carbonate is obtained.

Apart from its fairly poor retention, natural or precipitated calcium carbonate has as a further technological disadvantage the property that it is very sensitive to the aluminium phosphate sulphate used to precipitate the sizes.

German Pat. No. 27 37 742 is based on the problem of using by-products in the paper industry as fillers. The solution of this problem lies in the use of the calcium carbonate occurring on the causticizing of sulphate waste lyes from cellulose production as a filler for paper production, the calcium carbonate being used as a maximally 75% aqueous suspension in the form of the resultant lime slurry, after the standardization of its pH of between 5 and 12 by an acid or mixture of acids.

Further documents relating to retention are German Pat. No. 25 51 259 and German Auslegeschrift No. 1,546,240

Retention agents are also referred to as flocculation agents.

Fibrous subtances and fillers are mixed together in the pulp in the hollander or vat. The object is to bring both subtances to the screen of the paper-making machine as an homogeneous pulp, as far as possible without losses due to sinking in the liquor or washing out, in the given quantitative ratios. Here, however, fillers and fibrous substances behave quite differently as regards dispersibility, so that fillers may still occur in the effluent. A measure of this behaviour is the "total retention", the percentage ratio of the quantity of filler in the finished paper to the quantity of filler (absolutely dry) which was added altogether (including the fillers contained in the return water=white water). As high as possible retention (retention capacity) is aimed at, a large number of factors being involved in the physically complicated colloidal structure of the system fibre/filler/water, but not all being able to be varied under practical conditions.

A further important property in association with the use of pigments and similar materials in dyes and lacquers, papers and plastics is abrasiveness.

According to DIN 50320, the term "wear" is understood to mean "an undesirable change in the surface of objects in use through the loosening and separation of small particles through mechanical causes". In German usage the word "abrasion" borrowed from English is approximately equivalent to the concept of wear. Unlike DIN 50320, however, the term "wear" in the specialized literature covers the action of mechanical, chemical and thermal components (cf. the term "corrosion").

In the paper industry fillers occur suspended in water together with the fibres and adjuvants. They come into contact with rotating and stationary particles or pass between machine component surfaces which are in motion in relation to each other, e.g. the suction box and the screen of the paper-making machine. In these cases they cause damage to the surfaces of the machine components. Suspended pigments as components of coatings behave in a similar manner.

To determine numerical data relating to the abrasive action of fillers in aqueous suspension laboratory tests have been developed, for example by means of the Einlehn AT 1000 Abrasion Tester.

In North America and Scandinavia the Valley Tester is used with testing procedures specific to the apparatus is used for the same purpose.

Since the individual phenomena determining abrasion depend on the process and the equipment, the measurement method used must also be indicated together with the measurement results (A. Breunig and W. F. Hill, Verein Zellcheming, Berliner Allee 56,D-6100 Darmstadt, pamphlet V/27.5/75, published Oct. 23, 1975).

A further important requirement is as good an adhesion as possible between the particles and the coating agent in order to obtain better mechanical properties in the end product (David L. Skinner and Edward L. Moon, 27th Annual Technical Conference, 1972, Section 15-F, pages 1 to 4).

As is known, particularly fine-grained mineral fillers are now produced according to tne state of the art by wet grinding and subsequent drying. The products obtained are used in particular in the paint and lacquer, plastic and paper industries. Organic dispersion agents such as polyacrylates are normally used during the wet grinding. Products manufactured in this may contain very many agglomerates after drying and are characterized by poor dispersibility.

One of the most important properties of fine-grained fillers, pigments and similar materials, however, is their dispersibility, for example in plastics such as PVC, polycarbonate, polystyrene and polyethylene, as well as in lacquer artificial resin binders, softeners, papers, etc. In these cases as fine as possible a distribution of the filler or pigment in another material, for example in the aforementioned plastics, lacquers, papers, etc. should be achieved. The methods suitable for dispersion are grinding methods, or also apparatus based on the principals of ultrasonics. Generally speaking, dispension media are used in addition. Dispersion media are organic or inorganic, monomer or polymer substances which facilitate the dispersion of particles in a dispersion agent by reducing the surface tension between the two components, i.e. by wetting.

Dispersion media are substances with the property of preventing agglomerations or aggregations of the particles of pigments, fillers or resins and bringing these into a fine distribution or also countering in advance a tendency to agglomeration or even precipitation. They have surface-active properties and are used in the preparation (grinding) of fillers and dye pigments for coating compositions; and for a better distribution of resin-free pulps. Among those that can be mentioned are sodium hexametaphosphate, sodium pyrophosphate, alkylphenol-polyglycol ether, and alkyl-aryl sulphonic acid salts. The use of them should be confined to the smallest concentrations.

Readily dispersible inorganic pigments, the surfaces of which bear non-drying, fatty-acid-modified alkyd resins based on polycarboxylic acids, polyols and fatty acids with more than 6 C atoms, are already known from German Auslegeschrift No. 20 01 381.

German Offenlegungsschrift No. 24 56 463 discloses a method of preparing fine-grained calcium carbonate dispersions by homogenization of precipitated calcium carbonate in the presence of a dispersion medium into a suspension containing 15-25% water and subsequent wet grinding of the suspension, in which, for the purpose of producing readily dispersible calcium carbonate of a high degree of fineness and density, the dispersion is transformed into a free-flowing product.

German Pat. No. 29 08 699 describes a method of producing powder pigments with improved dispersion properties, in which the pigments are passed by known methods into a drier, the surface-active agent is introduced directly into the charging zone of this drier, which is separate from the actual drying zone, and on to the aqueous pigment pulp, after which the coated pigment is dried in the drying zone of the drier.

A method is disclosed in German Auslegeschrift No. 29 21 238 for the preparation of readily dispersible pigment preparations with a pigment content of more than 65% by weight, in which the pigment is suspended in water and in which a salt of an organic acid is used. This method is characterized by the fact that an octoate is used as the organic acid salt.

Finally, a method is known from German Pat. No. 23 46269 for the preparation of highly concentrated fine-grained calcium carbonate dispersions in which the calcium carbonate obtained by reaction of an aqueous calcium salt solution with a CaO content of 7-14% by weight with an aqueous alkali carbonate solution which contains 150-250 g/l $CO_2$ as carbonate and 5-10 g/l $CO_2$ as bicarbonate is first homogenized into a suspension containing 15 to 25% by weight water and this, after possibly further dilution to at the most 40% by weight water, is subjected to wet grinding. It is claimed that by this method highly concentrated, fine-grained calcium carbonate dispersions with $CaCO_3$ grain sizes of less than 5 $\mu$m and which contain up to 80% by weight calcium carbonate can be prepared.

Fine-grained calcium carbonates are nowadays generally prepared by wet grinding, and for use in the paint and lacquer industry, the plastic industry and in some cases even for use in the paper industry, are dried. During this drying agglomerates are formed which distinctly reduce the dispersibility. Consequently an obvious measure is to change to a dry grinding in which the disadvantage of agglomerate formation due to the drying process does not exist. Dry grinding methods of this kind are already known (e.g. from U.S. Pat. No. 3,022,185).

These methods, as can be expected, actually also lead to products which have a better dispersibility than those that have been obtained by wet grinding and subsequent drying. Here, of course, it must be borne in mind that in the dry known methods of dry grinding products with a coarser grain-size distribution than in the wet-grinding methods of the prior art are always obtained, which, on account of the larger particles, also automatically have a poorer dispersibility, so that, viewed as a whole, the dispersibility of the products that are obtained by the dry method is only insignificantly better than the dispersibility of the particles that are produced by wet grinding and subsequent drying.

SUMMARY OF THE INVENTION

One object of the present invention is to improve the essentially technical service properties of carbonate-containing mineral fillers, pigments and similar materials despite different possible applications.

The object is solved according to the invention by preparing from commercial carbonate-containing mineral fillers, pigments and similar materials, by further dry grinding and/or grading by particle size, products which have (a) a contrast factor of 1.2 to 2.1
(b) a mean particle diameter of 0.5 to 2.5 $\mu$m
(c) a fraction of 30 to 98% by weight of particles in the range from 0.5 to 1.8 $\mu$m particle diameter and
(d) a dispersibility, expressed in particle fineness as in DIN 53203, of 5 to 25 $\mu$m.

The specialized terms used in the afore-disclosed solution of the problem posed are defined below, using terms familiar to those skilled in the art and literature sources immediately accessible to specialists.

All fineness characteristics of the products obtained according to the invention mentioned in the present patent application were determined by sedimentation analysis of a gravitational field by the SEDIGRAPH 5000 produced by the company Micromeritics, U.S.A. This apparatus is known to the average specialist and is used throughout the world to determine the fineness of fillers and pigments. The measurement was made in a 0.1% by weight aqueous $Na_4P_2O_7$ solution. The dispersion of the samples was effected by rapid stirrer and ultrasonics.

The particle distribution measured is shown on an X-Y plotter as a transient sum curve (see, for example, Belger, P., Schweizerische Vereinigung der Lack- und Farben-Chemiker, XVII. FATIPEC Congress, Lugano, Sept. 23-28, 1984), the particle diameter of a corresponding spherical diameter being plotted on the X-axis and the proportion of particles as a percentage by weight on the Y-axis.

The four fineness characteristics defined below were read off from the curves obtained by the method described above or calculated.

1. The upper section is the diameter, in $\mu$m, of the coarsest particles of the products according to the invention or of the reference products, in each case read off from the particle-size distribution curve obtained in the manner described above.
2. The mean particle diameter of the products according to the invention or of the reference products is the particle diameter in $\mu$m read off from the X axis at a value on the Y axis of 50% by weight of the particles.
3. The proportion of particles in the range from 0.5 to 1.8 $\mu$m is calculated as follows: the value in % by weight read from the Y axis at a particle diameter of 1.8 $\mu$m minus the value, in % by weight, read from the Y axis at a particle diameter of 0.5 $\mu$m.

With regard to the three definitions given above, see also Belger, P., Schweizerische Vereinigung der Lack- und Farben-Chemiker, XVII. FATIPEC-Kongress, Lugano, Sept. 23-28, 1984.

4. The contrast factor is calculated by the formula $$\frac{\text{particle diameter in } \mu m \text{ at 50\% by weight}}{\text{particle diameter in } \mu m \text{ at 20\% by weight}}$$

it being possible in each case to read off the particle diameter in $\mu$m as previously described.

5. Determination of dispersibility, expressed in particle fineness as in DIN 53203

The products to be tested are tested for dispersibility in pigment-binder mixture based on a long-oil alkyd resin with a 75% oil content consisting of vegetable fatty acids, e.g. PLUSOL DL 75 made by Pluss-Staufer AG, CH- 4665 Oftringen, Switzerland, which is commercially available and a titanium dioxide with a $TiO_2$ content of 94%, e.g. KRONOS RN 59 made by KRONOS TITAN GmbH, Leverkusen, West Germany, which is available commercially. For this purpose the particle fineness depending on time is determined as in DIN 53203. The following recipe is used for testing:

| | |
|---|---|
| 113.0 parts by weight | alkyd resin with a ricinene linseed oil base with 75% oil content, 55% solution in test benzine |
| 100.0 parts by weight | titanium dioxide with a $TiO_2$ content of 94% |
| 100.0 parts by weight | of the filler, pigment or similar material to be tested. |
| 313.0 parts by weight | |

The products mentioned in this recipe are weighed into a dispersion container with an inside diameter of 7.5 cm and a height of 6.5 cm. The dispersion is effected by means of a rapidly operating stirrer at 3000 rpm using a toothed dissolver disc with a diameter of 6.0 cm. After a stirring time of 8 minutes the particle fineness obtained is determined by grindometer as in DIN 53203.

6. Determination of the abrasion value with the Einlehner abrasion tester AT 1000

The testing is carried out with the Einlehner AT 1000 abrasion tester (see description by A. Breunig and W. F. Hill, Verein Zellcheming, Berliner Allee 56, D-6100 Darmstadt, pamphlet V/27.5/75, published Oct. 23, 1975).

The rotating body with attached PVC rings is used. The standard test screen made of phosphorbronze as in the description given above is used as the test screen. The abrasion values of the individual products are determined in a 10% by weight aqueous suspension. The abrasion value is given in mg weight loss of the phosphor bronze screen after a testing duration of 2 hours.

The contrast factor preferably lies in a range from 1.2 to 2.0. Very good results are obtained with a contrast factor of 1.2 to 1.9. Quite particularly good results are observed with a contrast factor of 1.2 to 1.8.

The mean particle diameter preferably lies in a range from 0.5 to 2.3 $\mu$m. Very good results are obtained with a mean particle size of from 0.6 to 2.1 $\mu$m. The mean particle diameters again preferred within this range are 0.7 to 2.0 $\mu$m, 0.7 to 1.8 $\mu$m, 0.7 to 1.6 $\mu$m and 0.7 to 1.5

μm. Quite outstanding results are obtained with a mean particle diameter from 0.9 to 1.4 μm.

The carbonate-containing fillers, pigments and similar substances according to the invention preferably have a fraction of 40 to 98% by weight of particles in the particle diameter range from 0.5 to 1.8 μm. Very good results are obtained with a fraction of from 50 to 98% by weight and from 60 to 98% by weight. Quite particularly good results are obtained with a fraction of from 70 to 98% by weight.

The dispersibility, expressed in particle fineness according to DIN 53203 preferably lies in a range from 5 to 20 μm. Very good results are obtained in a range from 5 to 15 μm. Particularly good results are obtained in a range from 5 to 10 μm.

The upper section is preferably a maximum of 15 μm. Very good results are obtained with an upper section of a maximum of 12 μm. Even better results are obtained with an upper section of a maximum of 10 μm. Particularly good results are obtained with an upper section of a maximum of 8 μm. The result is optimal when an upper section of a maximum of 6 μm is observed.

The abrasion value, determined by the Einlehner AT 1000 abrasion tester, is preferably at a maximum of 10 mg. Good results are obtained with a maximum abrasion value of 8 mg. Very good results are obtained with a maximum abrasion value of 6 mg. Particularly good results are obtained with an abrasion value of a maximum of 4 mg. Optimal results are obtained with an abrasion value of a maximum of 2 mg.

The carbonate-containing mineral fillers, pigments and similar materials preferably consist of chalk and/or limestone and/or marble and/or dolomite-containing calcium carbonate and/or dolomite, or of natural chalk and/or limestone and/or marble and/or dolomite-containing calcium carbonate and/or dolomite.

The method of preparing carbonate-containing mineral fillers, pigments and similar materials according to the invention is characterized in that first an initial material is prepared, which has an upper section of 10 to 50 μm and a mean particle diameter of 2 to 10 μm. For this purpose a preliminary comminution of the raw material is first carried out, for example by means of a crusher and fine grinding by mills with loose grinding bodies and/or roller mills and/or impact pulverizers. From this the actual initial products are prepared with an upper section of 10 to 50 μm and a mean diameter of from 2 to 10 μm, for example by known wind screening. Such products can also be obtained commercially. From these initial materials there are then prepared according to the invention through grading by wind screening the final products which have (a) a contrast factor of 1.2 to 2.1
(b) a mean particle diameter of 0.5 to 2.5 μm,
(c) a fraction of 30 to 98% by weight of particles in the range from 0.5 to 1.8 μm particle diameter and
(d) a dispersibility, expressed in particle fineness as in DIN 53203 from 5 to 25 μm.

The Multi-Plex Zigzag Screen 100 MZR (ALPINE) used in the following examples can be immediately replaced by an industrial-scale screen by the specialist. The method according to the invention is characterized in particular in that an initial material with an upper section of 10 to 50 μm and a mean particle diameter of from 2 to 10 μm is first dry ground in a manner in itself known and then, by grading by particle size by wind screening with a laboratory Multi-Plex Zigzag 100 MZR screen (ALPINE) at a screening wheel speed of from 5000 to 20,000 rpm and an air input of 20 to 45 standard cubic meters per hour treated so that the resulting fillers, pigments and similar materials have (a) a contrast factor of from 1.2 to 2.1,
(b) a mean particle diameter of from 0.5 to 2.5 μm,
(c) a fraction of 30 to 98% by weight of particles in the range from 0.5 to 1.8 μm particle diameter and
(d) a dispersibility, expressed in particle fineness according to DIN 53203 of from 5 to 25 μm.

Further objects, solution features and advantages of the invention will emerge from the following description of embodiments, examples of application and comparative examples.

Preparation of the test products according to the invention

Commerical carbonate-containing fillers, pigments and similar materials are prepared as follows according to the state of the art:

Preliminary comminution of the raw material, for example by means of a crusher, and dry fine grinding by means of mills with loose grinding bodies and/or roller mills and/or impact crushers.

From these, by means of wind screening, in itself known, commercial products with an upper section of 10 to 50 μm and a mean particle diameter of 2 to 10 μm are prepared.

Such commercial products are used as initial material for the production of the test products according to the invention.

Such initial materials are subjected to a further grading by particle size with a laboratory Multi-Plex-Zigzag 100 MZR (ALPINE) screener. The screening conditions here can be selected as follows depending on the final fineness required.

The speed of the screening wheel may be 5,000 to 20,000 rpm (revolutions per minute) and the quantity of air introduced 20 to 45 standard cubic meters per hour.

(A) Embodiments

Example 1

Figure 1:
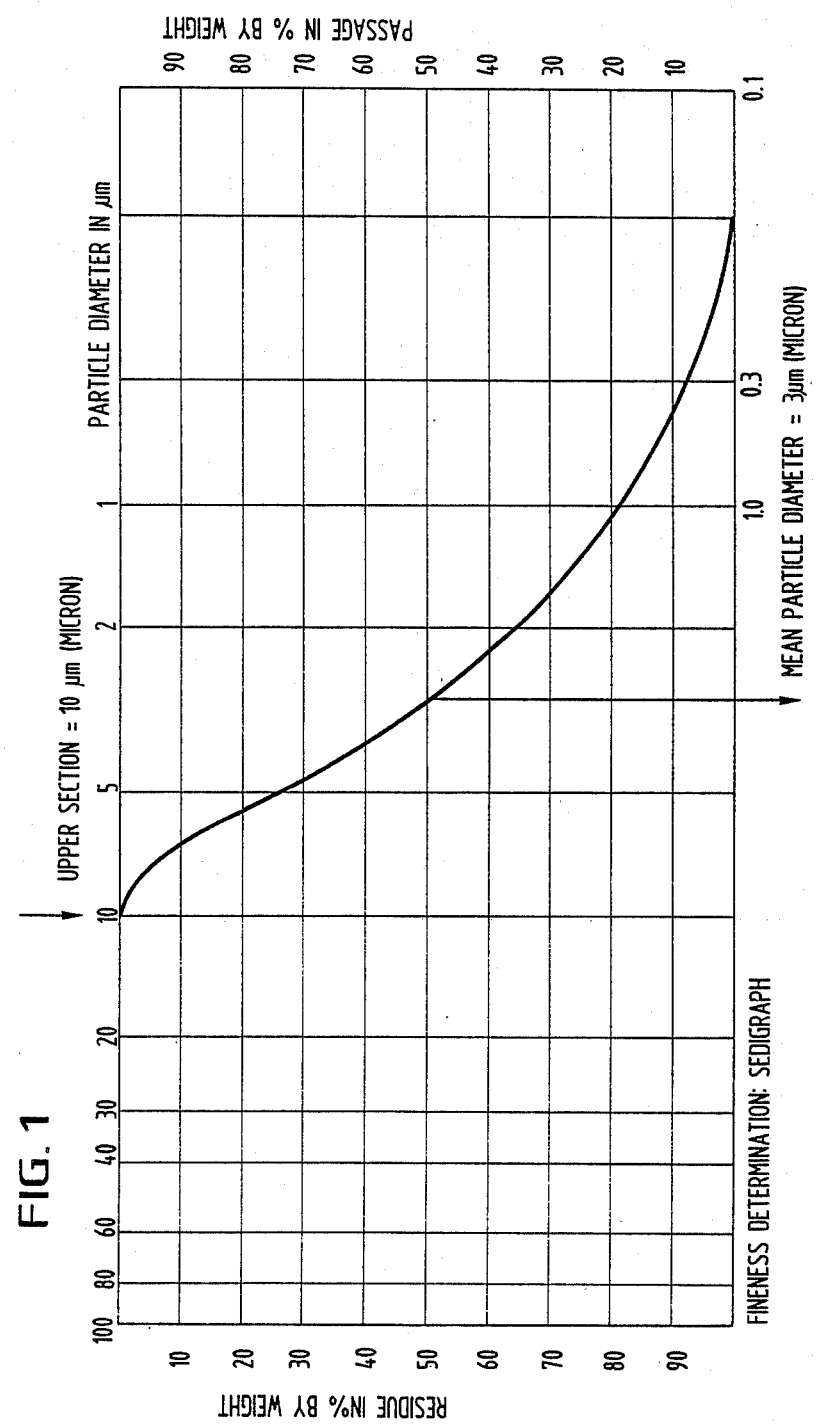
FIG. 1 is a grain-size distribution curve of commerical limestone.

Commercial limestone with an upper section of 10 μm and a mean particle diameter of 3 μm as shown in the grain-size distribution curve in FIG. 1, was graded with a laboratory Multi-Plex 100 MZR zigzag screen made by the company Alpine with a screening wheel speed of 18,000 rpm and a quantity of air of 32 Nm³/h.

Test product deposited in the cyclone of the screen as fine material was subjected to the tests described below.

1. Fineness characteristics

The following fineness characteristics of the product prepared according to the invention were determined by sedimentation analysis in a gravitational field with a SEDIGRAPH 5000 made by Micromeritics, U.S.A.

The measurement was made in a 0.1 % by weight aqueous $Na_4P_2O_7$ solution. The samples were dispersed using a rapid stirrer and ultrasonics.

Figure 2:
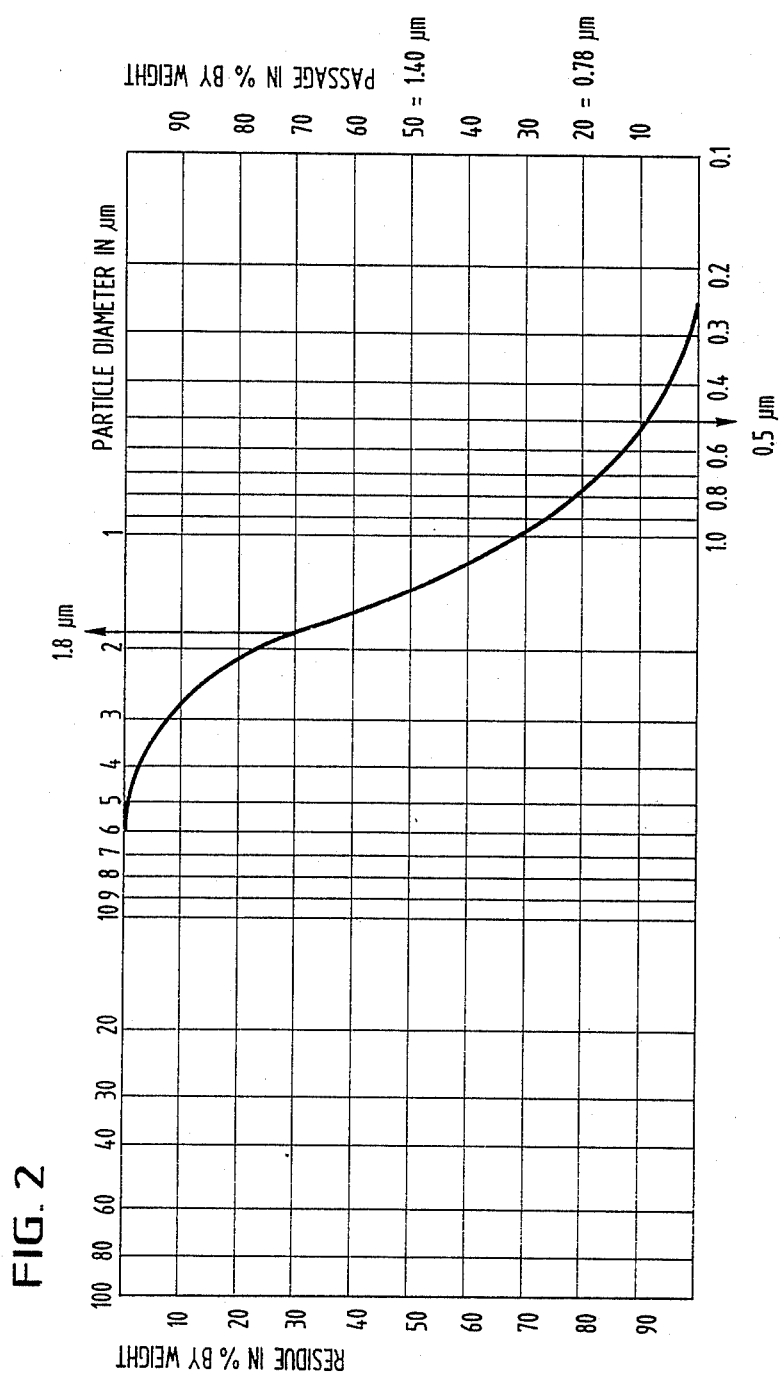
FIG. 2 is a grain-size distribution curve of commercial limestone after treatment.

The particle distribution measured was plotted on a X-Y plotter as a throughput sum curve, the particle diameter of a corresponding spherical diameter being plotted on the X axis and the fraction of particles as a percentage by weight being plotted on the Y axis (see FIG. 2).

The four fineness characteristics defined below were read off from the curve obtained by the method described above or calculated.

a. The upper section is the diameter, in $\mu m$, of the coarsest particles product according to the invention read off from the particle-size distribution curve obtained as described above.

In the present example the upper section was 6 $\mu m$.

7. The mean particle diameter of the product according to the invention is the particle diameter, in $\mu m$, read off from the X axis at a value on the Y axis of 50% by weight of the particles. In the present example the mean particle diameter was 1.4 $\mu m$.

c. The fraction of particles in the range from 0.5 to 1.8 $\mu m$ is calculated as follows:

The value, as a percentage by weight, read off from the Y axis at a particle diameter of 1.8 $\mu m$ minus the value, as a percentage by weight read off from the Y axis at a particle diameter of 0.5 $\mu m$.

In the present example the fraction of particles in the range from 0.5 to 1.8 $\mu m$ particle diameter was 62% by weight.

d. The contrast factor is calculated by the formula $$\frac{\text{particle diameter in } \mu m \text{ at 50\% by weight}}{\text{particle diameter in } \mu m \text{ at 20\% by weight}}$$

thereby in each case reading off the particle diameter in $\mu m$ in the manner previously described. In the present example the contrast factor was $$\frac{1.40 \ \mu m \text{ at 50\% by weight}}{0.78 \ \mu m \text{ at 20\% by weight}} = 1.8$$

2. Determination of the dispersibility, expressed in particle fineness according to DIN 53203

The product to be tested was tested for dispersibility in a pigment—binder mixture based on a long-oil alkyd resin with an oil content of 75% comprising vegetable fatty acids, namely PLUSOL DL 75, produced by the firm Pluss-Staufer AG, CH-4665 Oftringen, Switzerland, which is available commerically, and a titanium dioxide with a $TiO_2$ content of 94% by weight, namely KRONOS RN 59, produced by KRONOS TITAN GmbH, Leverkusen, West Germany, which is available commercially. For this purpose the particle fineness obtained depending on time was determined according to DIN 53203. The following recipe was used:

| | |
|---|---|
| 113.0 parts by weight | alkyd resin with a ricinene linseed oil base with 55% solution in test benzine |
| 100.0 parts by weight | titanium dioxide with a $TiO_2$ content of 94% |
| 100.0 parts by weight | test product |
| 313.0 parts by weight | |

-continued

The products mentioned in this recipe were weighed into a dispersion container with an inside diameter of 7.5 cm and a height of 6.5 cm. The dispersion was effected by means of a rapidly operating stirrer at 3000 rpm, using a toothed dissolver disc with a diameter of 6.0 cm. After a stirring time of 8 minutes the particle fineness was determined by grindometer according to DIN 53203.

In the present example the dispersibility was 10 $\mu m$.

3. Determination of the abrasion values with the Einlehner AT 1000 abrasion tester The testing was carried out with the Einlehner AT 1000 abrasion tester (see description by A. Breunig and W. F. Hill, Verein Zellcheming, Berliner Allee 56, D-6100 Darmstadt, pamphlet V/27.5/75, published Oct. 23, 1975).

A rotating body with attached PVC rings was used. A standard phosphor-bronze test screen as in the description above was used as the test screen. The abrasion values of the individual products were determined in a 10% by weight aqueous suspension. The abrasion value is given in mg weight loss of the phosphor bronze screen after a test duration of 2 hours.

In the present example the abrasion value was 4 mg. The grain-size distribution curve is illustrated in FIG. 2.

Example 2

Figure 3:
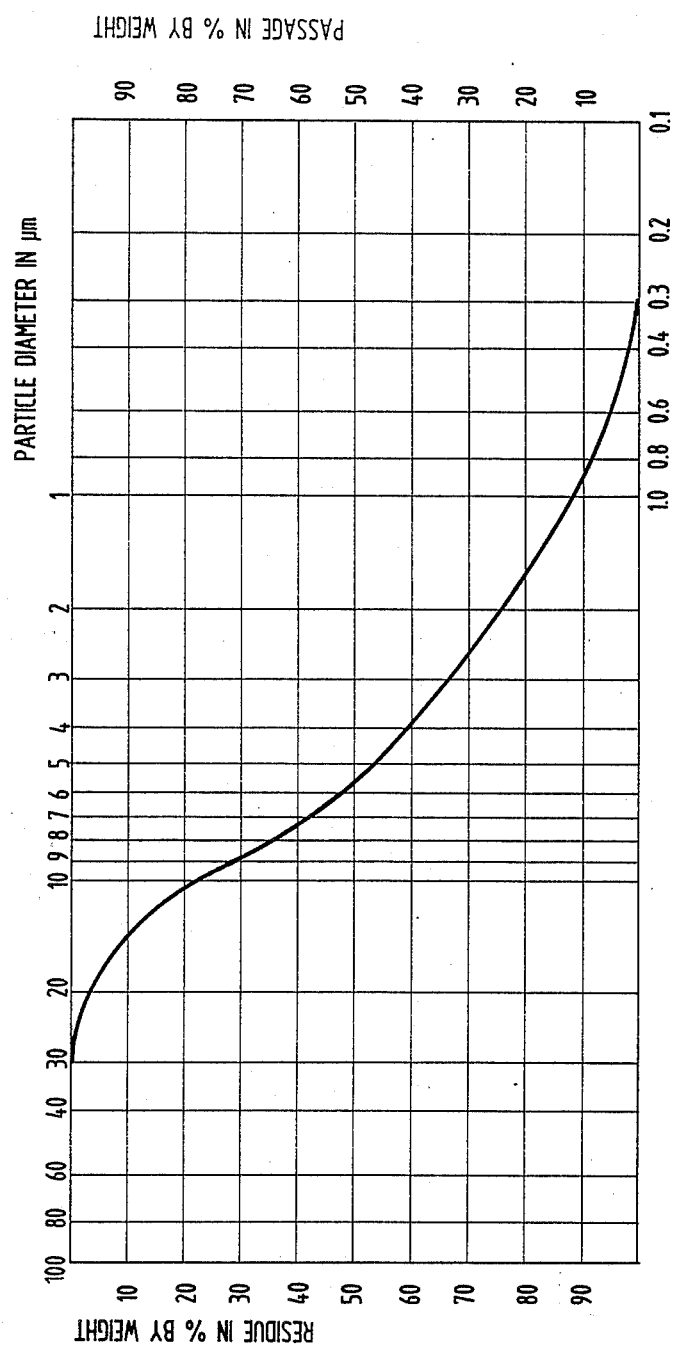
FIG. 3 is a grain-size distribution curve of commercial dolomite.

A commercial dolomite with an upper section of 30 $\mu m$ and a mean particle diameter of 5.7 $\mu m$ (as shown in the grain-size distribution curve of FIG. 3) was graded with the screen described in Example 1 with a separation wheel speed of 7,000 rpm and an air quantity of 43 $Nm^3/h$.

The test product obtained in the cyclone as fines was tested as in Example 1 and had a contrast factor of 2.1, a mean particle diameter of 2.5 $\mu m$, a fraction of particles in the range 0.5–1.8 $\mu m$ particle diameter of 30% by weight and a dispersibility of 25 $\mu m$. The upper section was 15 $\mu m$. The abrasion value was 10 mg.

Example 3

Figure 4:
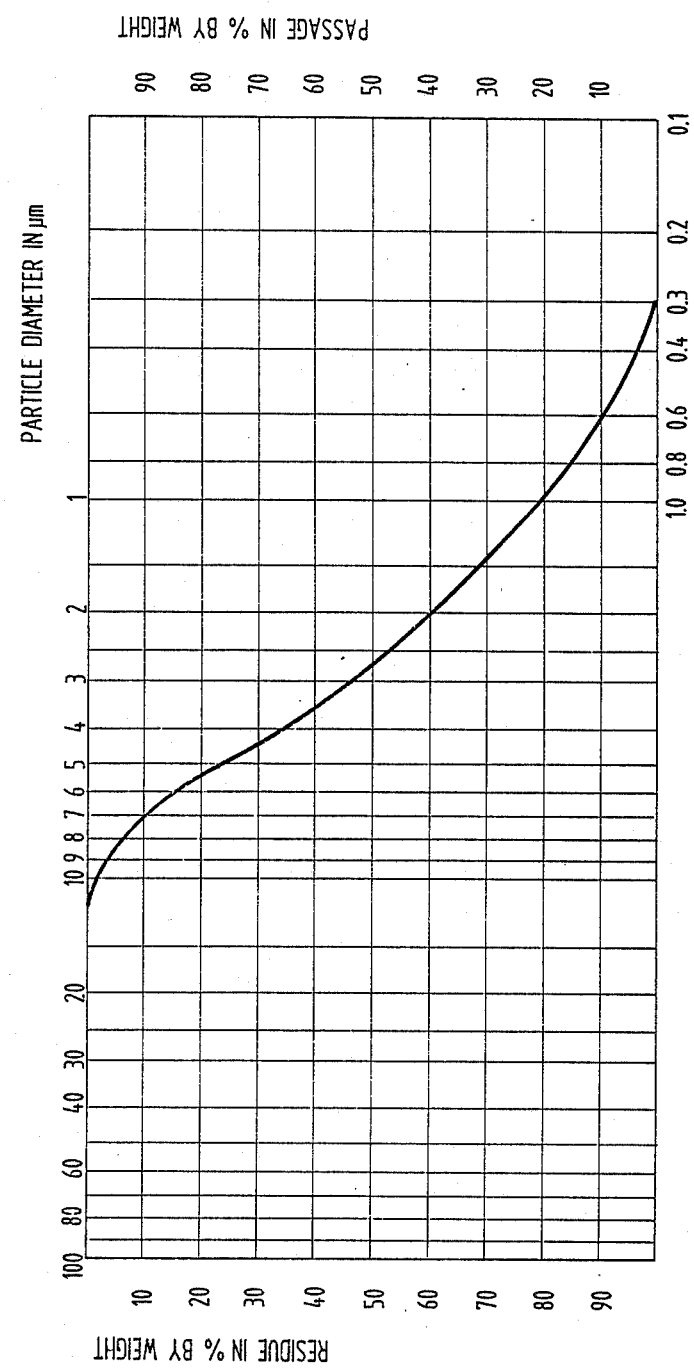
FIG. 4 is a grain-size distribution curve of commercial dolomite containing calcium carbonate of the marble type.

A commerical dolomite containing calcium carbonate of the marble type with an upper section of 12 $\mu m$ and a mean particle diameter of 2.7 $\mu m$ (as shown in the grainsize distribution curve of FIG. 4) was graded with the screen described in Example 1 with a separation wheel speed of 20,000 rpm and an air quantity of 30 $Nm^3/h$.

The test product obtained in the cyclone as fines was tested as in Example 1 and had a contrast factor of 1.6, a mean particle diameter of 0.5 $\mu m$, a fraction of particles in the range 0.5–1.8 $\mu m$ particle diameter of 49% by weight and a dispersibility of 6 $\mu m$. The upper section was 2 $\mu m$ and the abrasion value was 3 mg.

Example 4

Figure 5:
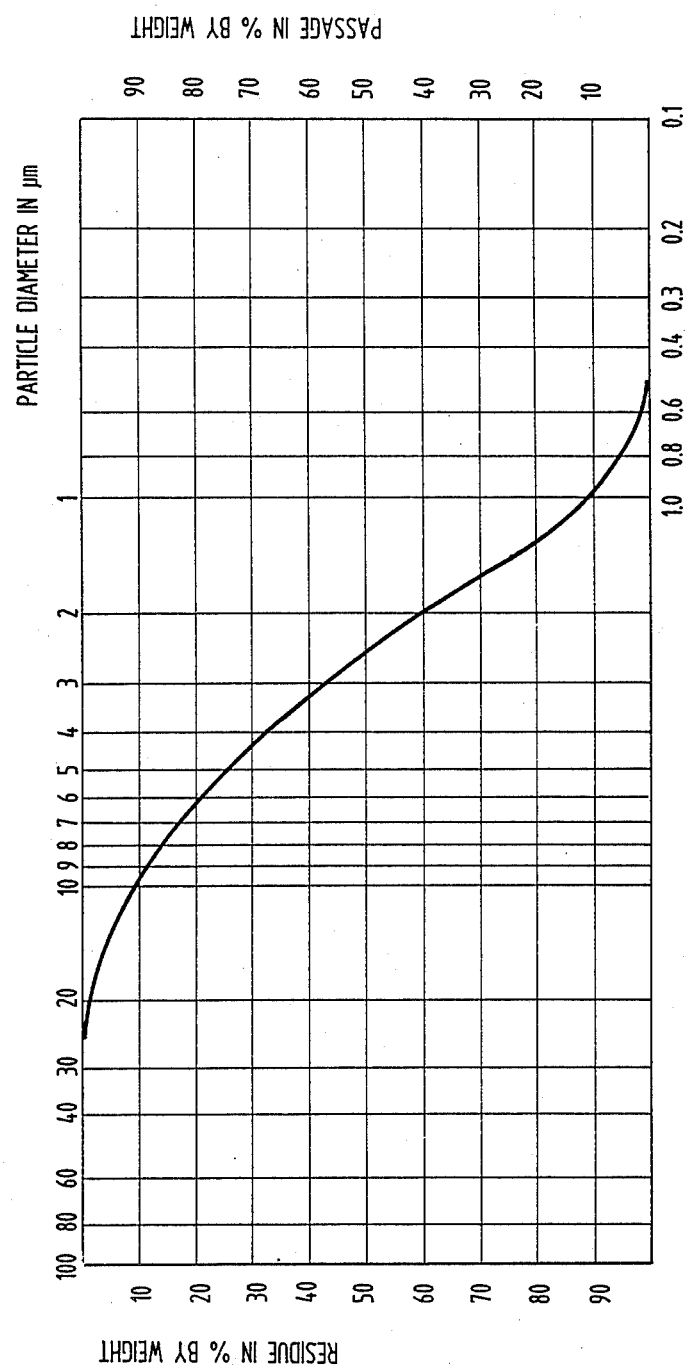
FIG. 5 is a grain-size distribution curve of commercial natural chalk.

Commercial natural chalk with an upper section of 25 $\mu m$ and a mean particle diameter of 2.5 $\mu m$ (as shown in the grain-size distribution curve of FIG. 5) was graded with the screen described in Example 1 at the maximum separation wheel speed of 20,000 rpm and a quantity of air of 25 $Nm^3/h$.

The test product obtained in the cyclone as fines was tested as in Example 1 and had a contrast factor of 1.2, a mean particle diameter of 0.72 μm, a fraction of particles in the range of 0.5–1.8 μm particle diameter of 98% by weight and a dispersibility of 5 μm. The upper section was 3 μm and the abrasion value was 1 mg.

(B) Examples of application

Example 5

A commercial natural chalk with the fineness described in Example 4 was graded with the screen described in Example 1 so that the products C–F in the table below were obtained, The products A and B are commercial products and correspond to the state of the art.

The products were tested as regards opacity (in accordance with DIN 53146, Testing of Paper and Paperboard, "Determination of Opacity") in a paper pulp.

The paper sheets were prepared with the following recipe:

| | |
|---|---|
| 80% by weight birch sulphate pump | fibre with a beating degree of 25° Schopper-Riegler |
| 20% by weight pine sulphate pulp | |
| 0.06% by weight high-molecular polyacrylamide = retention agent | |

Filler fraction

20% by weight related to the paper pulp Area weight: (paper+filler, determined according to DIN 53104 SHEET 1)

75 g/m²

Determination of the opacity:

The opacity=a measure of the light-permeability of paper was determined according to DIN 53146 (edition of March 1979) with a photoelectric remission photometer of the Elrephomat type.

Results

TABLE 1

| Product | Contrast factor | Mean part. diam. μm | Fraction of particles in range 0.5–1.8 μm | Dispersibility μm | Upper Section μm | Opacity % |
|---|---|---|---|---|---|---|
| A | 2.5 | 1.6 | 40% by wt. | 20 | 16 | 87.9 |
| B | 2.2 | 0.6 | 51% by wt. | 30 | 3 | 87.4 |
| C | 1.6 | 1.7 | 52% by wt. | 10 | 8 | 88.3 |
| D | 1.6 | 1.5 | 62% by wt. | 10 | 8 | 88.7 |
| E | 1.5 | 1.4 | 72% by wt. | 10 | 8 | 89.4 |
| F | 1.4 | 1.0 | 88% by wt. | 8 | 6 | 90.2 |

The products C–F according to the invention are characterized as compared with the state of the art (products A and B) with different contrast factor and mean particle diameter and with an increasing fraction of particles in the range 0.5 to 1.8 μm by much better dispersibility and a higher opacity which increases even further as the particle diameter decreases, i.e. as the products become finer.

Example 6

Six products (B–G) were prepared as in example 5 with the screen described in Example 1 and with the fineness as described in example 1 from a commercial limestone. Product A corresponds to the state of the art.

Results

TABLE 2

| Product | Contrast factor | Mean particle diam. μm | Fraction of particles in range 0.5–1.8 μm % by wt. | Dispersibility μm | Abrasion values mg | Upper sect. μm | Opacity % |
|---|---|---|---|---|---|---|---|
| A | 2.5 | 2.5 | 29 | 25 | 12 | 15 | 84.6 |
| B | 1.8 | 2.3 | 31 | 10 | 8 | 8 | 85.7 |
| C | 1.7 | 2.0 | 40 | 10 | 6 | 6 | 86.1 |
| D | 1.7 | 1.8 | 50 | 8 | 5 | 6 | 86.7 |
| E | 1.8 | 1.4 | 62 | 8 | 4 | 6 | 87.6 |
| F | 1.7 | 1.2 | 73 | 7 | 3 | 5 | 88.0 |
| G | 1.9 | 0.7 | 70 | 5 | 2 | 3 | 88.0 |

The products B–G corresponding to the claim have, in comparison with product A, a filler corresponding to the present state of the art, distinctly better opacity values on account of their much better distribution (dispersion in the paper pulp).

(C) Comparative examples

Example 7

A commercial limestone with the fineness described in Example 1 was graded with the screener described in Example 1 with a separation wheel speed of 20,000 rpm and a quantity of air of 20 Nm³.

The product B according to the invention was tested for viscosity behaviour in a joint-sealing material with a polysulphide polymer base with a commercial product (product A) wet-ground in the presence of a dispersion agent and then dried.

Recipe

| | |
|---|---|
| Polysulphide polymer (Thiokol LP-32, Thiokol Corp., Trenton, N.J.) | 35 parts by weight |
| Chlorparaffin 52 (Hoechst AG, Frankfurt) | 35 parts by weight |
| Filler | 30 parts by weight |

Test conditions

The joint-sealing material was dispersed by means of a dissolver at ambient temperature for 2 minutes. The viscosity was measured with a Rheomat 135 at 20° C. in accordance with DIN 125.

Results

TABLE 3

| Product | Contrast factor | mTd | Fraction 0.5–1.8 μm | Dispersibility | Upper Section | Viscosity in Pa—S at shear rates (S$^{-1}$) | | | | |
|---|---|---|---|---|---|---|---|---|---|---|
| | | | | | | 1 | 2.5 | 5 | 10 | 25 | 50 |
| A | >2.7 | 0.54 μm | 48 Gew. % | 35 μm | 3 μm | 161 | 103 | 77 | 59 | 47 | 41 |
| B | 1.9 | 0.7 μm | 70 Gew. % | 5 μm | 3 μm | 311 | 168 | 113 | 79 | 53 | 43 |

The viscosity measurement shows that the product B according to the invention, as compared with the state of the art (product A), gives at low shear rate practically double the viscosity in Pa.s. This viscosity behaviour (thixotropy) is desirable in this application and thus represents a note-worthy technical advance.

Example 8

A commercial limestone with the fineness described in Example 1 was graded with the screener described in Example 1 with a separation wheel speed of 19,500 rpm and a quantity of air of 30 Nm$^3$.

This filler (product B) was compared with a commercial product corresponding to the present state of the art (product A) in hard PVC.

Product A, which was wet-ground in the presence of dispersions agents and then dried, was surface-treated with 0.8% stearic acid to improve dispersibility.

A test was made of the notch impact toughness, a test which is regarded by those skilled in the art as a very sensitive determination of the dispersion of fillers in hard PVC.

Recipe

| | |
|---|---|
| S-PVC with K value 65 | 100.0 parts by weight |
| Lead sulphate (tribasic) | 1.5 parts by weight |
| Lead stearate | 1.3 parts by weight |
| Calcium stearate | 0.6 parts by weight |
| E wax (Hoechst AG Frankfurt) | 0.05 parts by weight |
| Filler | 15.0 parts by weight |

Test conditions

The PVC and all stabilizers and lubricants were placed in a Papenmeier high-speed mixer of 14 liters capacity. The quantity introduced was 7 kg. From the cold state the mixture was heated by frictional heat and heat applied through the double mantle at 1800 rpm to 100° C. and held for 5 minutes at 100°–105° C. The speed of the mixer was then reduced to 600 rpm and the mixture cooled to 50° C. (cold water allowed to circulate in the double mantle). The filler was added at 450 rpm and homogenized for 1 minute. The mixer was then emptied.

Preparation of hardboard

From the Dry Blend 300 g were weighed and thickened in a two-roller mill with diameter 150 mm and length 400 mm at 185° C. for 5 minutes with continued turning.

After these 5 minutes the rough sheet (2–4 mm thick) was removed from the roller and pressed to the required thickness in a frame. For this purpose the material was subjected to preliminary pressing at 190° C. for 2 minutes with 10 kN and then loaded for 3 minutes with 200 kN. The sheet was then introduced into a second water-cooled press at 20° C. at a pressure of 10 kN.

Results

TABLE 4

| Product | Contrast factor | Mean part. diameter μm | Fraction 0.5–1.8 μm % by wt. | Dispersibility μm | Upper section μm | Notch toughness as per DIN 53453 |
|---|---|---|---|---|---|---|
| A | 3.6 | 1.00 | 60 | 30 | 4 | 7.5 ± 0.4 mJ/mm$^2$ |
| B | 1.7 | 1.20 | 73 | 7 | 5 | 8.1 ± 0.5 mJ/mm$^2$ |

With the produce B according to the invention slightly higher notch impact toughness values were obtained, on account of its better dispersibility, than with product A corresponding to the present state of the art, which had to be subjected to surface treatment to improve the dispersion properties.

Example 9

A commercial marble with the fineness described in Example 3 was graded with the screener described in Example 1 with a separation wheel speed of 19,500 rpm and an air quantity of 30 Nm$^3$/h.

The filler according to the invention that was produced (product B) was tested in a highly filled internal dispersion paint with a commercial product of comparable fineness which corresponds to the present state of the art.

Recipe

| | |
|---|---|
| 293 parts by weight | water |
| 1 part by weight | preservative with a chlorinated acid amide/fluoride base |
| 3 parts by weight | dispersions agent with polyacrylate base |
| 19 parts by weight | wetting agent with polyphosphate of medium chain length, 10% in water as base |
| 1 part by weight | foam-suppressing agent |
| 50 parts by weight | talcum |
| 320 parts by weight | calcium carbonate with 5 μm mean particle diameter |
| 125 parts by weight | filler (product A and B respectively) |
| 60 parts by weight | rutile titanium dioxide |
| 4 parts by weight | thickener (methyl cellulose) |
| 1 part by weight | ammonia, 25% |
| 3 parts by weight | butyl diglycolacetate |
| 15 parts by weight | white spirit |
| 105 parts by weight | dispersion binder, about 50% based on pressure polymer of vinyl acetate, vinyl chloride, ethylene |

The paints were prepared with dissolvers. 72 hours after the preparation of the paints they were applied with a film drawing apparatus (23.8 mm/sec) with an application bar with an aperture width of 150 μm on contrast cards.

The whiteness and covering capacity measurements were made with a spectral photometer in accordance with DIN 53 140 (C/2°).

Results

TABLE 5

| Product | Contrast factor | Mean particle diameter | Fraction 0.5–1.8 μm | Dispersibility | Upper Section | whiteness Rx | Ry White | Ry Black | Rz | Yellow value | Covering capacity |
|---------|----------------|----------------------|---------------------|---------------|--------------|------|----------|----------|------|--------------|-------------------|
| B | 1.6 | 1.0 | 75 Gew % | 14 μm | 8 μm | 90.4 | 90.1 | 87.2 | 87.2 | 3.6 | 96.8% |
| A | 2.8 | 0.8 | 52 Gew % | 30 μm | 5 μm | 90.4 | 90.1 | 86.7 | 87.5 | 3.2 | 96.2% |

The product B according to the invention, despite a larger mean particle diameter, gives a higher covering capacity than in the state of the art (product A), with the same whiteness.

The invention has in particular the following advantages.

With the products according to the invention further important properties could be improved in the various fields of application:

in the case of colors and paints, in particular the covering capacity and the gloss;

in the paper industry, for the paper pulp a higher opacity, better retention values (since the products according to the invention were prepared without the addition of dispersion agent) and a lower abrasiveness;

in the plastics industry better rheological conditions are obtained in plastisols and sealing materials as well as an improvement in mechanical properties are obtained, +, e.g. in hard P.V.C.

In addition, the products according to the invention represent a more convenient initial material for subsequent surface treatment (adhesion).

It can be seen from the terms "dispersion agent" and "retention agent (flocculation agent)" which have been defined in detail above, that the dispersibility of the fillers in paper pulp is also an important criterion with regard to retention. It can also be seen that retention agents are added to obtain a good bonding of the filler or the pigment or similar materials with the fibre.

It can be seen, on the other hand, that dispersion agents are necessary to prevent the agglomeration of filler particles. The said dispersion agents, however, are exactly the opposite of retention agents, which explains why the fillers prepared by wet grinding in the presence of dispersion agents give unsatisfactory retention values. The essential advantage of the fillers, pigments or similar materials according to the invention also lies in the fact that these can be prepared without dispersion agents and are nevertheless characterized by an outstanding dispersibility.

Despite all this, it is unusually surprising that the products according to the invention improve all the properties mentioned, since the requirements as regards fineness for gloss, opacity, abrasion are to some extent in contradiction to the requirements for retention and adhesion.

The embodiments of the invention in which an exclusive property or privilege is claimed are defined as follows:

1. Carbonate-containing mineral fillers, pigments and similar materials, having a mean particle-diameter of 0.5 to 2.5 μm and the following further physical properties:
   (a) a contrast factor of 1.2 to 2.1.
   (b) a fraction of 30 to 98% by weight of particles in particle diameter range 0.5 to 1.8 μm, and
   (c) a dispersibility, expressed in particle fineness according to DIN 53203, of 5 to 25 μm.

2. Carbonate-containing mineral fillers, pigments and similar materials according to claim 1, having a contrast factor of 1.2 to 2.0.

3. Carbonate-containing mineral fillers, pigments and similar materials according to claim 1, having a contrast factor of 1.2 to 1.9.

4. Carbonate-containing mineral fillers, pigments or similar materials according to claim 1, having a contrast factor of 1.2 to 1.8.

5. Carbonate-containing mineral fillers, pigments or similar materials according to claim 1, having a mean particle diameter of 0.5 to 2.3 μm.

6. Carbonate-containing mineral fillers, pigments or similar materials according to claim 1, having a mean particle diameter of 0.6 to 2.1 μm.

7. Carbonate-containing mineral fillers, pigments or similar materials according to claim 1, having a mean particle diameter of 0.7 to 2.0 μm.

8. Carbonate-containing mineral fillers, pigments and similar materials according to claim 1, having a mean particle diameter of 0.7 to 1.8 μm.

9. Carbonate-containing mineral fillers, pigments or similar materials according to claim 1, having a mean particle diameter of 0.7 to 1.6 μm.

10. Carbonate-containing mineral fillers, pigments or similar materials according to claim 1, having a mean particle diameter of 0.7 to 1.5 μm.

11. Carbonate-containing mineral fillers, pigments or similar materials according to claim 1, having a mean particle diameter of 0.9 to 1.4 μm.

12. Carbonate-containing mineral fillers, pigments or similar materials according to claim 1, having a fraction of from 40 to 98% by weight of particles in the particle diameter range from 0.5 to 1.8 μm.

13. Carbonate-containing mineral fillers, pigments or similar materials according to claim 1, having a fraction of from 50 to 98% by weight of particles in the particle diameter range from 0.5 to 1.8 μm.

14. Carbonate-containing mineral fillers, pigments or similar materials according to claim 1, having a fraction of from 60 to 98% by weight of particles in the particle diameter range from 0.5 to 1.8 μm.

15. Carbonate-containing mineral fillers, pigments or similar materials according to claim 1, having a fraction of from 70 to 98% by weight of particles in the particle diameter range from 0.5 to 1.8 μm.

16. Carbonate-containing mineral fillers, pigments or similar materials according to claim 1, having a dispersibility of from 5 to 20 μm.

17. Carbonate-containing mineral fillers, pigments or similar materials according to claim 1, having a dispersibility of from 5 to 15 μm.

18. Carbonate-containing mineral fillers, pigments or similar materials according to claim 1, having a dispersibility of from 5 to 10 μm.

19. Carbonate-containing mineral fillers, pigments or similar materials according to claim 1, having an upper section of a maximum of 15 μm.

20. Carbonate-containing mineral fillers, pigments or similar materials according to claim 1, having an upper section of a maximum of 12 μm.

21. Carbonate-containing mineral fillers, pigments and similar materials according to claim 1, having an upper section of a maximum of 10 μm.

22. Carbonate-containing mineral fillers, pigments and similar materials according to claim 1, having an upper section of a maximum of 8 μm.

23. Carbonate-containing mineral fillers, pigments and similar materials according to claim 1, having an upper section of a maximum of 6 μm.

24. Carbonate-containing mineral fillers, pigments and similar materials according to claim 1, having an abrasion value of a maximum of 10 mg.

25. Carbonate-containing mineral fillers, pigments and similar materials according to claim 1, having an abrasion value of a maximum of 8 mg.

26. Carbonate-containing mineral fillers, pigments and similar materials according to claim 1, having an abrasion value of a maximum of 6 mg.

27. Carbonate-containing mineral fillers, pigments and similar materials according to claim 1, having an abrasion value of a maximum of 4 mg.

28. Carbonate-containing mineral fillers, pigments and similar materials according to claim 1, having an abrasion value of a maximum of 2 mg.

29. The carbonate-containing minerals according to claim 1, wherein said minerals are selected from the group of calcium carbonates consisting of chalk, limestone, marble, synthetic $CaCO_3$ and dolomite.

30. The method preparing calcium carbonate-containing mineral fillers, pigments and similar materials which comprises the steps of dry grinding an initial material with an upper section of 10 to 50 μm and a mean particle diameter ranging from 2 to 10 μm and then grading by wind screening said ground material by particle size, so that said screened product has the physical properties
(a) a contrast factor of 1.2 to 2.1;
(b) a mean particle diameter of 0.5 to 2.5 μm;
(c) a fraction of 30 to 98% by weight of particles in the particle-size range from 0.5 to 1.0 μm; and
(d) a dispersibility, expressed in particle fineness in accordance with DIN 53203 of 5 to 25 μm.

31. The carbonate-containing mineral fillers, pigments and similar materials as in claim 1, which are prepared by dry grinding and grading by particle size and are used in dyes and paints, in papers and in plastics.

32. The carbonate-containing mineral fillers, pigments and similar material as in claim 1 when used in plastisols and sealing compounds.

33. The carbonate-containing mineral fillers, pigments and similar materials as in claim 1 when used in paper pulp.

34. The carbonate-containing mineral fillers, pigments and similar materials as in claim 1 when used in a paper coating.

35. The method according to claim 30, wherein said wind screening is performed with a Multi-Plex 100 MZR zigzag screener (ALPINE) at a separation wheel speed of 5000 to 20,000 rpm with the introduction of a quantity of air of 20 to 45 standard cubic feet per hour.

36. A filler composition for use in dye, paint, paper, plastic, sealing compounds, plastisols and similar filler-requiring purposes, comprising the carbonate filler material, according to claim 1, in combination within a suitable carrier for such purposes.

37. The filler composition according to claim 36 wherein said carbonate filler material is formulated with a sealing plastisol composition.

38. The filler composition according to claim 36, wherein said carbonate filler material is formulated into a paper-coating composition.

* * * * *